(12) United States Patent
Menke, III

(10) Patent No.: US 8,425,098 B2
(45) Date of Patent: Apr. 23, 2013

(54) EMERGENCY VEHICLE LIGHT BAR

(75) Inventor: W. Kenneth Menke, III, Webster Groves, MO (US)

(73) Assignee: PowerArc, Inc., Shrewsbury, MO (US)

( * ) Notice: Subject to any disclaimer, the term of this patent is extended or adjusted under 35 U.S.C. 154(b) by 177 days.

(21) Appl. No.: 12/788,948

(22) Filed: May 27, 2010

(65) Prior Publication Data

US 2011/0292648 A1    Dec. 1, 2011

(51) Int. Cl.
 *B60Q 1/26* (2006.01)
 *B60Q 1/00* (2006.01)
 *B60Q 1/52* (2006.01)
 *H01R 33/00* (2006.01)

(52) U.S. Cl.
 USPC ............ 362/542; 362/493; 362/648; 340/471

(58) Field of Classification Search .................. 362/493, 362/35, 648, 542; 340/471–474
 See application file for complete search history.

(56) References Cited

U.S. PATENT DOCUMENTS

| | | | |
|---|---|---|---|
| 4,543,622 A * | 9/1985 | Menke et al. | 362/219 |
| 4,928,216 A | 5/1990 | Carr | |
| 4,956,753 A * | 9/1990 | Renfrew | 362/493 |
| 5,097,397 A * | 3/1992 | Stanuch et al. | 362/493 |
| 5,422,623 A | 6/1995 | Bader et al. | |
| 5,452,188 A | 9/1995 | Green et al. | |
| 5,826,965 A * | 10/1998 | Lyons | 362/477 |
| 5,931,573 A | 8/1999 | Knox | |
| 6,081,191 A | 6/2000 | Green et al. | |
| 6,140,918 A * | 10/2000 | Green et al. | 340/468 |
| 6,461,008 B1 | 10/2002 | Pederson | |
| 6,863,424 B2 * | 3/2005 | Smith | 362/455 |
| 7,261,447 B2 * | 8/2007 | Menke et al. | 362/503 |
| 7,524,075 B2 * | 4/2009 | Mastin | 362/35 |
| 7,789,530 B2 * | 9/2010 | Stein et al. | 362/249.14 |
| 7,819,565 B2 * | 10/2010 | Stein | 362/493 |
| 7,854,531 B1 * | 12/2010 | Lyons | 362/217.1 |
| 2003/0031028 A1 * | 2/2003 | Murray et al. | 362/545 |
| 2006/0273121 A1 | 12/2006 | Thomas | |
| 2008/0232129 A1 * | 9/2008 | Lyons | 362/547 |
| 2008/0310177 A1 | 12/2008 | Clark | |
| 2009/0116257 A1 | 5/2009 | Rosemeyer et al. | |
| 2009/0161377 A1 | 6/2009 | Helms et al. | |

* cited by examiner

*Primary Examiner* — David J Makiya
(74) *Attorney, Agent, or Firm* — Joseph M. Rolnicki; Evans & Dixon, LLC

(57) ABSTRACT

A light bar for use on firefighting or other emergency vehicles includes an elongate base that provides a versatile mounting platform for primary visual and audible warning devices as well as providing a mounting platform for other types of equipment such as secondary visual and audible devices, optical devices, cameras, weather monitoring equipment, GPS devices, preemption devices, running lights and other devices that have been traditionally mounted on a firefighting or emergency vehicle roof and/or other exterior surface area of the emergency vehicle. The light bar is versatile in both allowing many different types of equipment to be selectively mounted and adjustably positioned on the base, and on pairs of support plates that are attachable to the opposite ends of the base and provide support for different combinations of signal lights and other equipment.

18 Claims, 16 Drawing Sheets

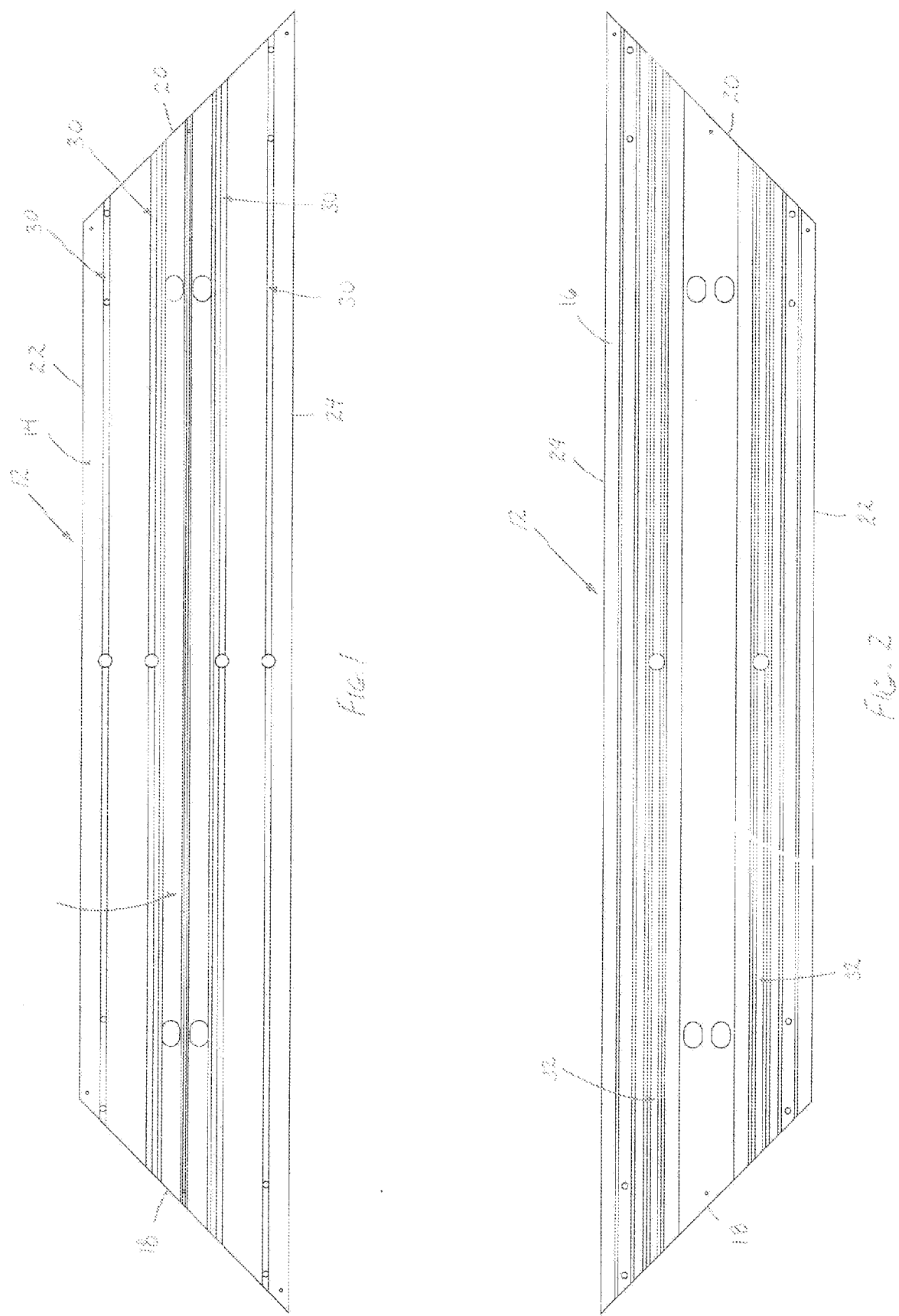

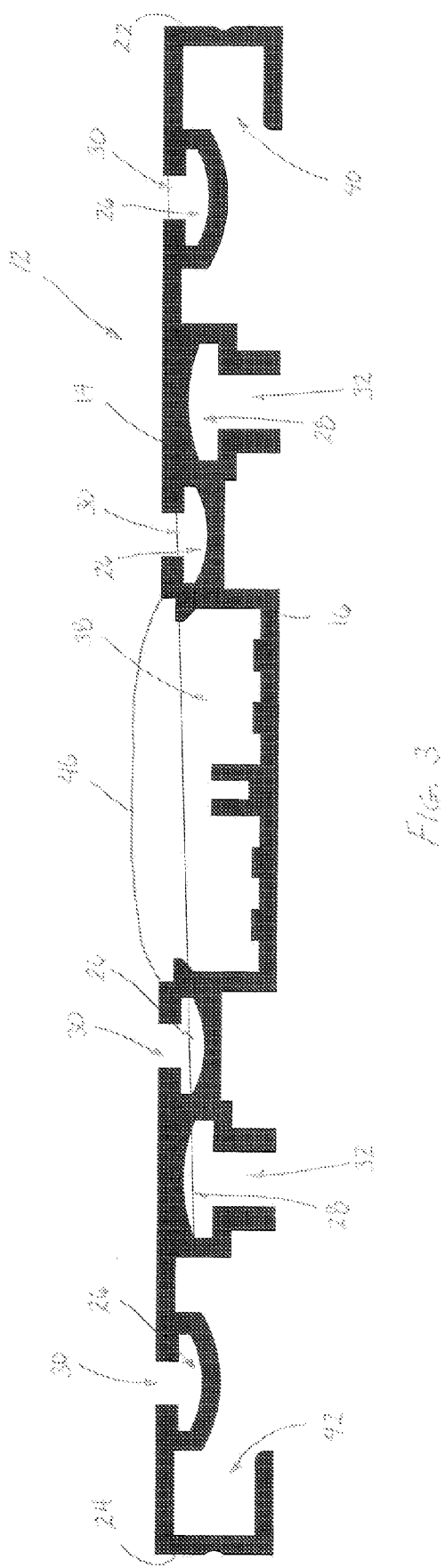

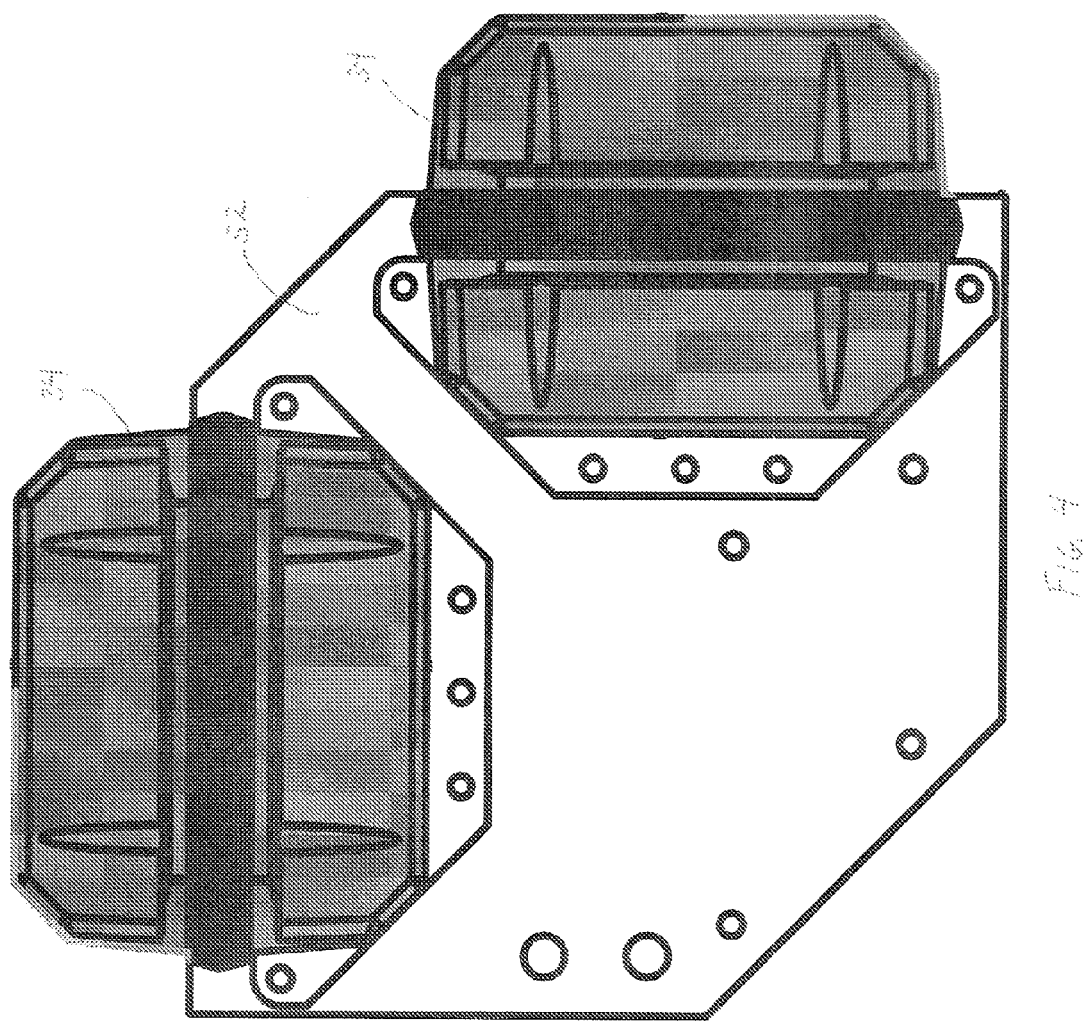

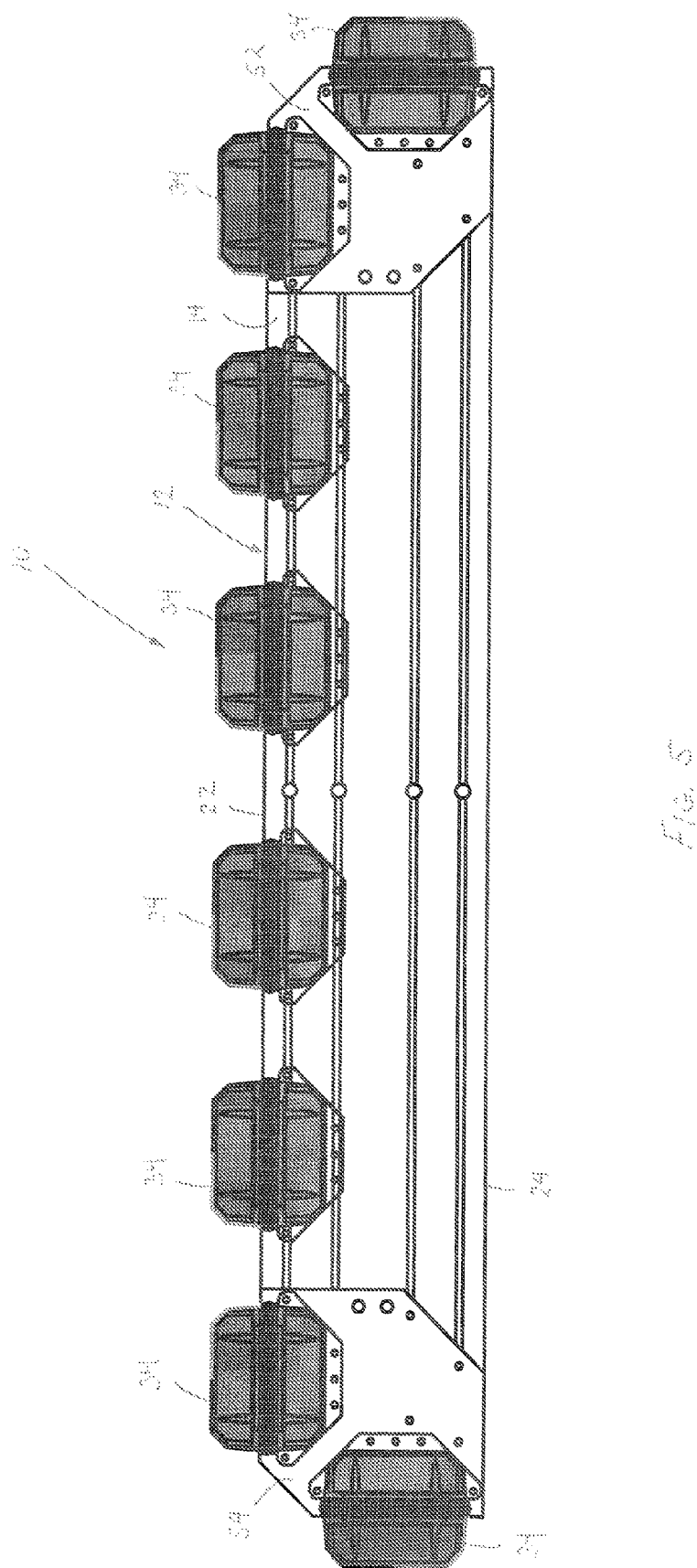

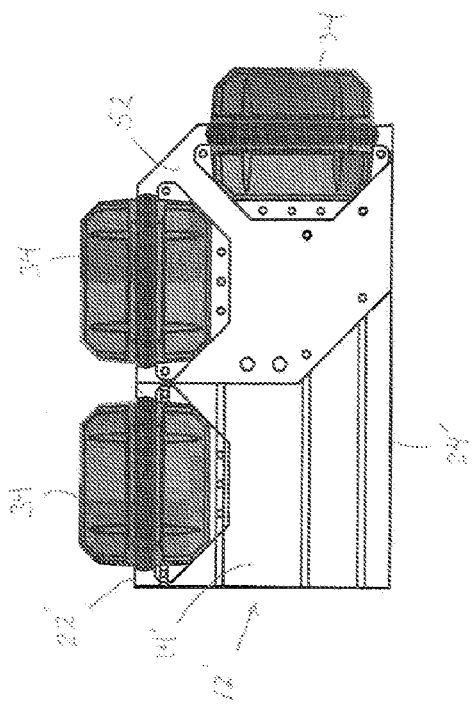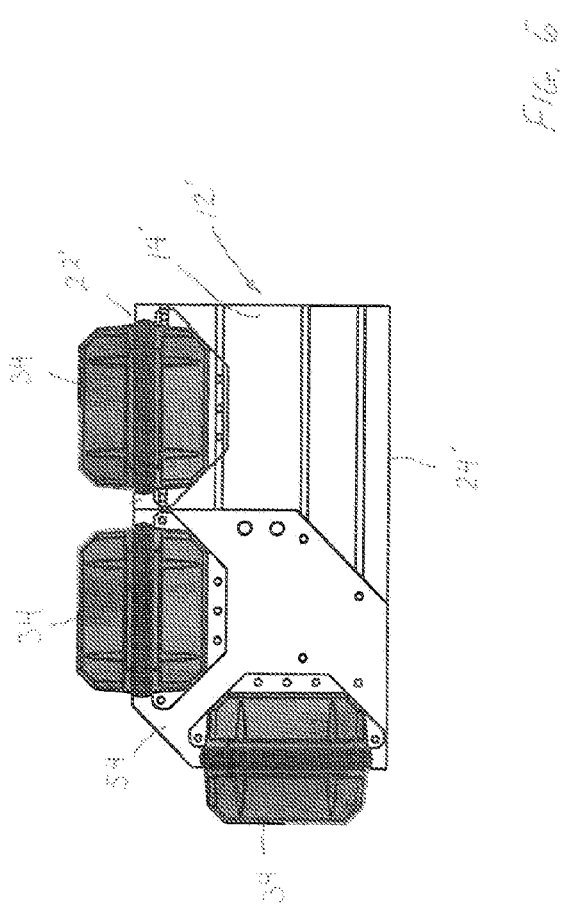

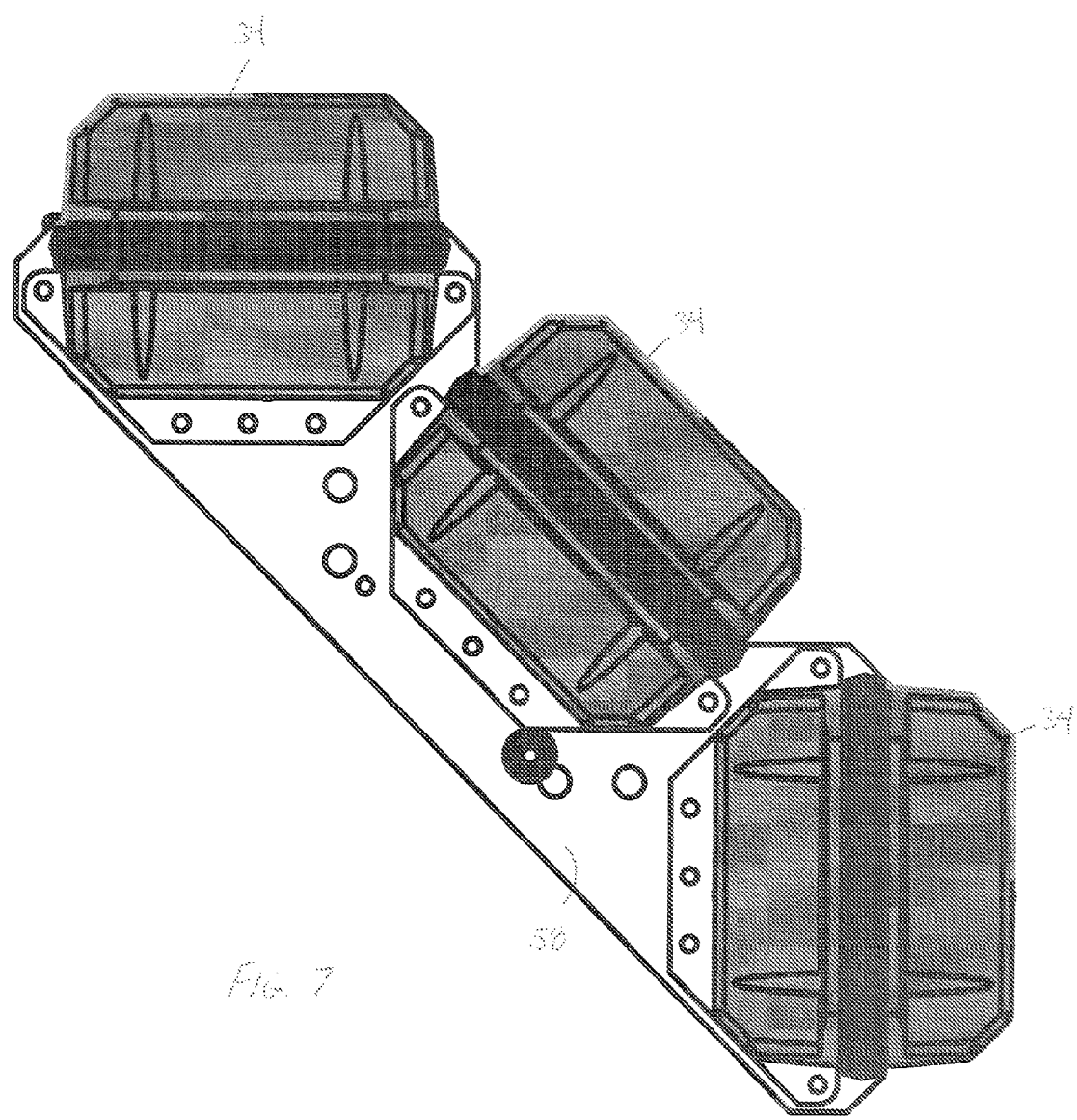

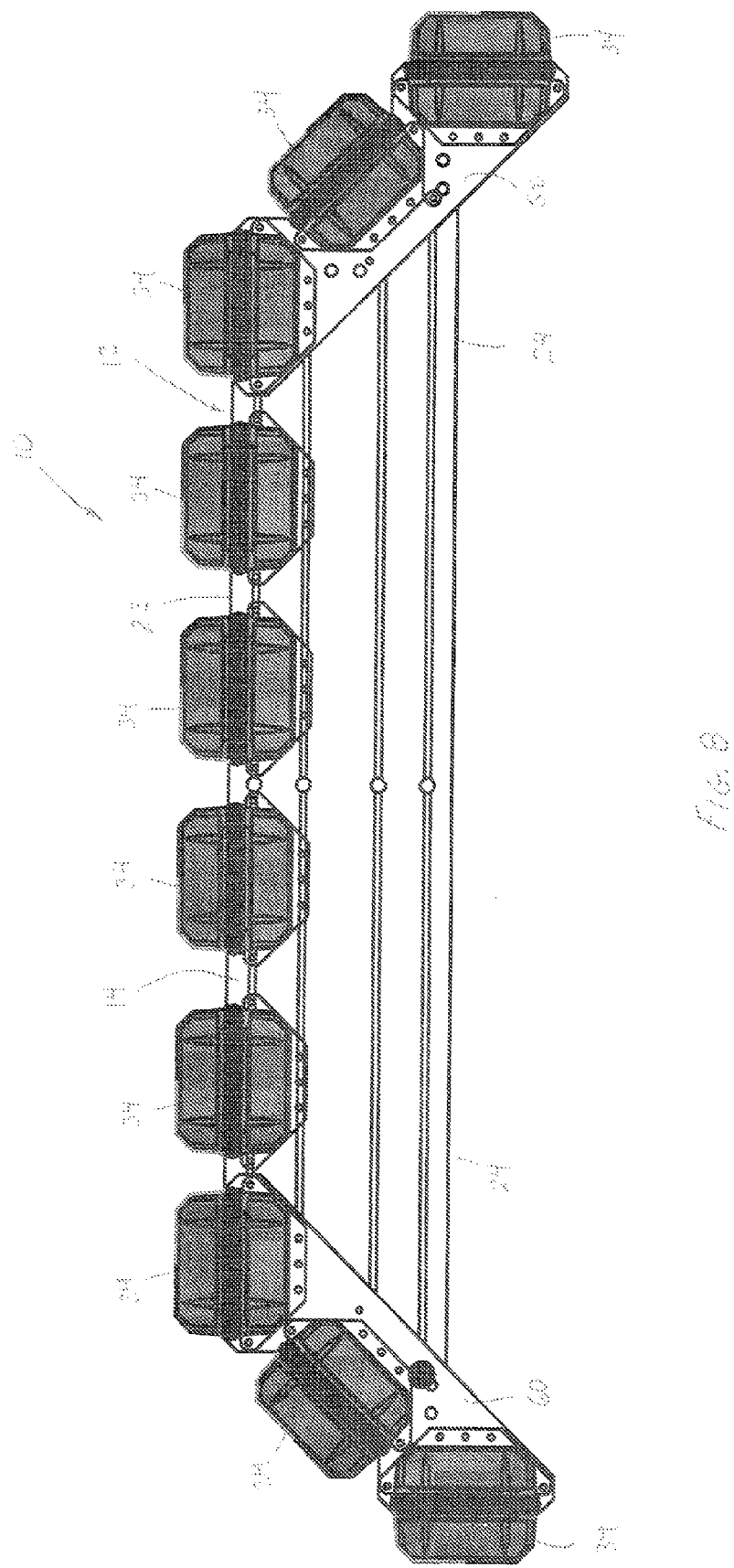

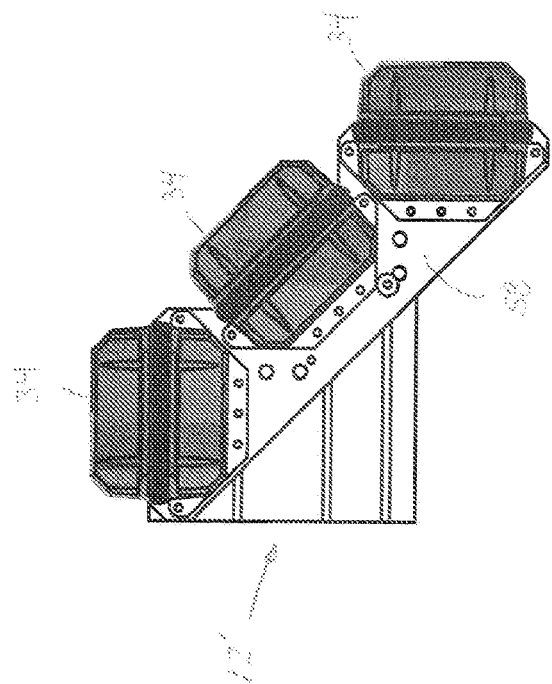
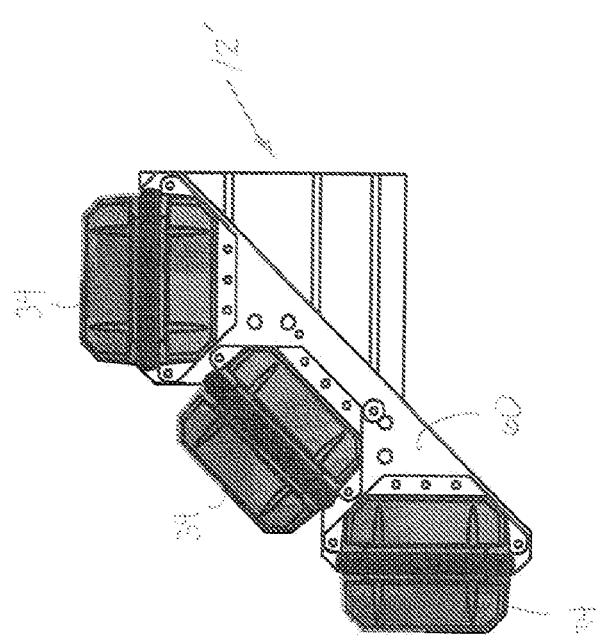

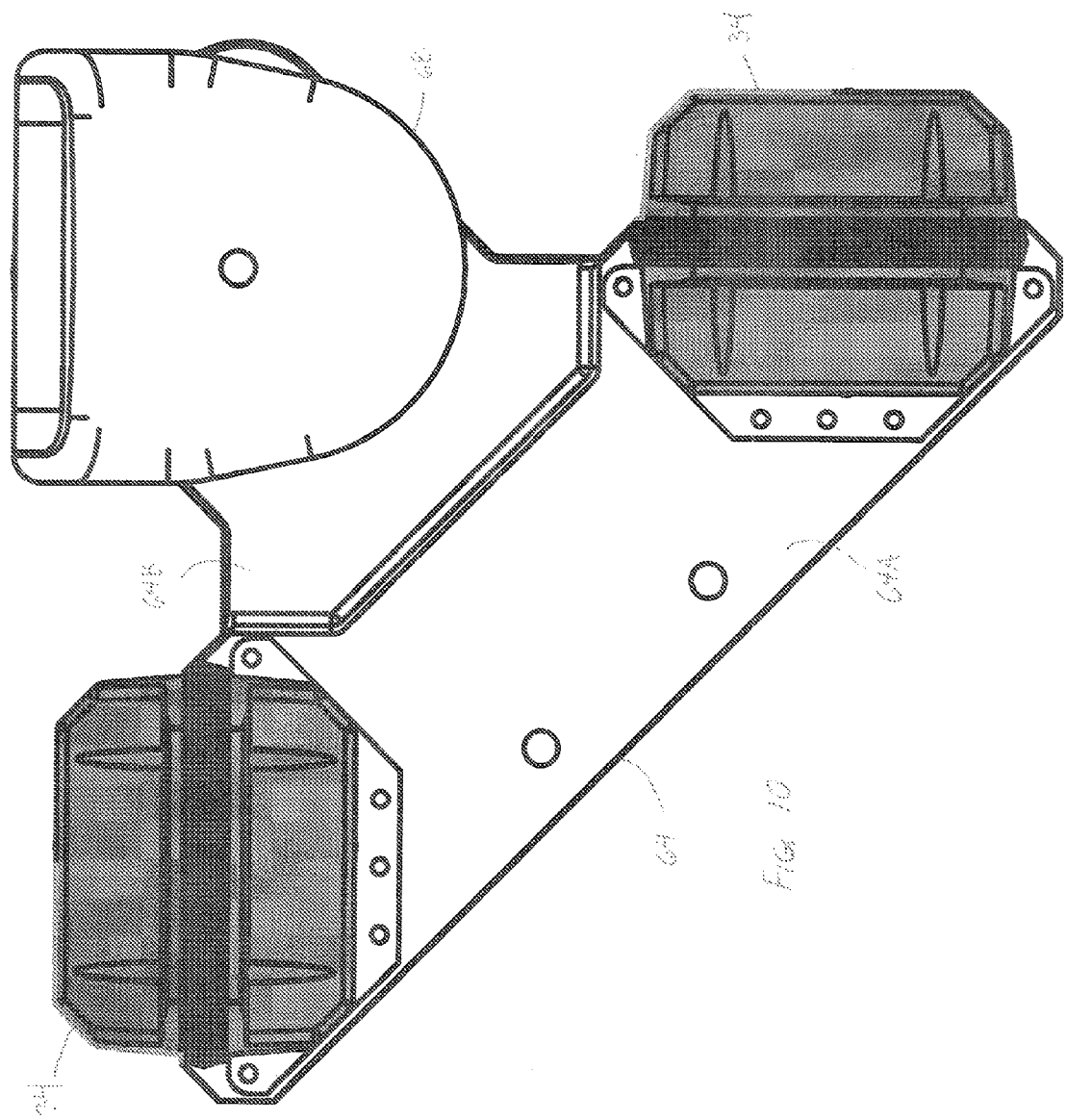

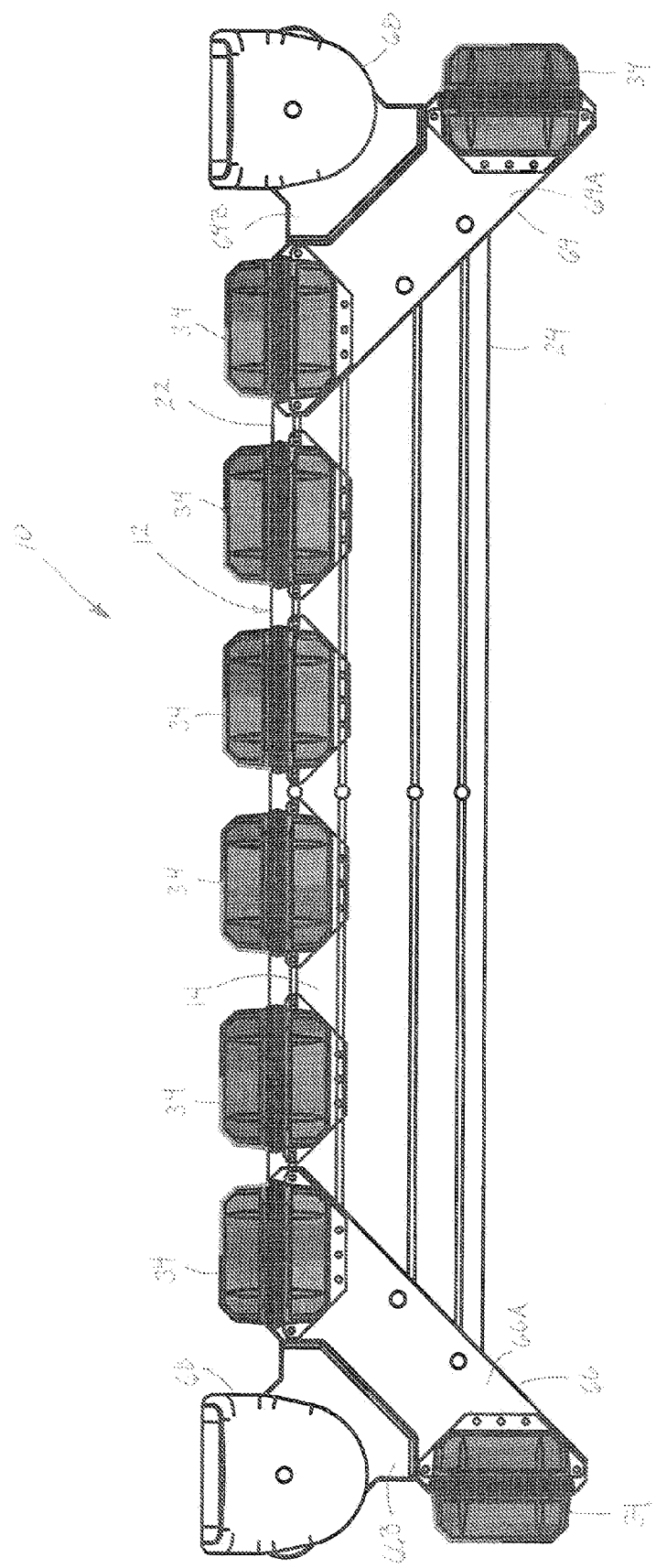

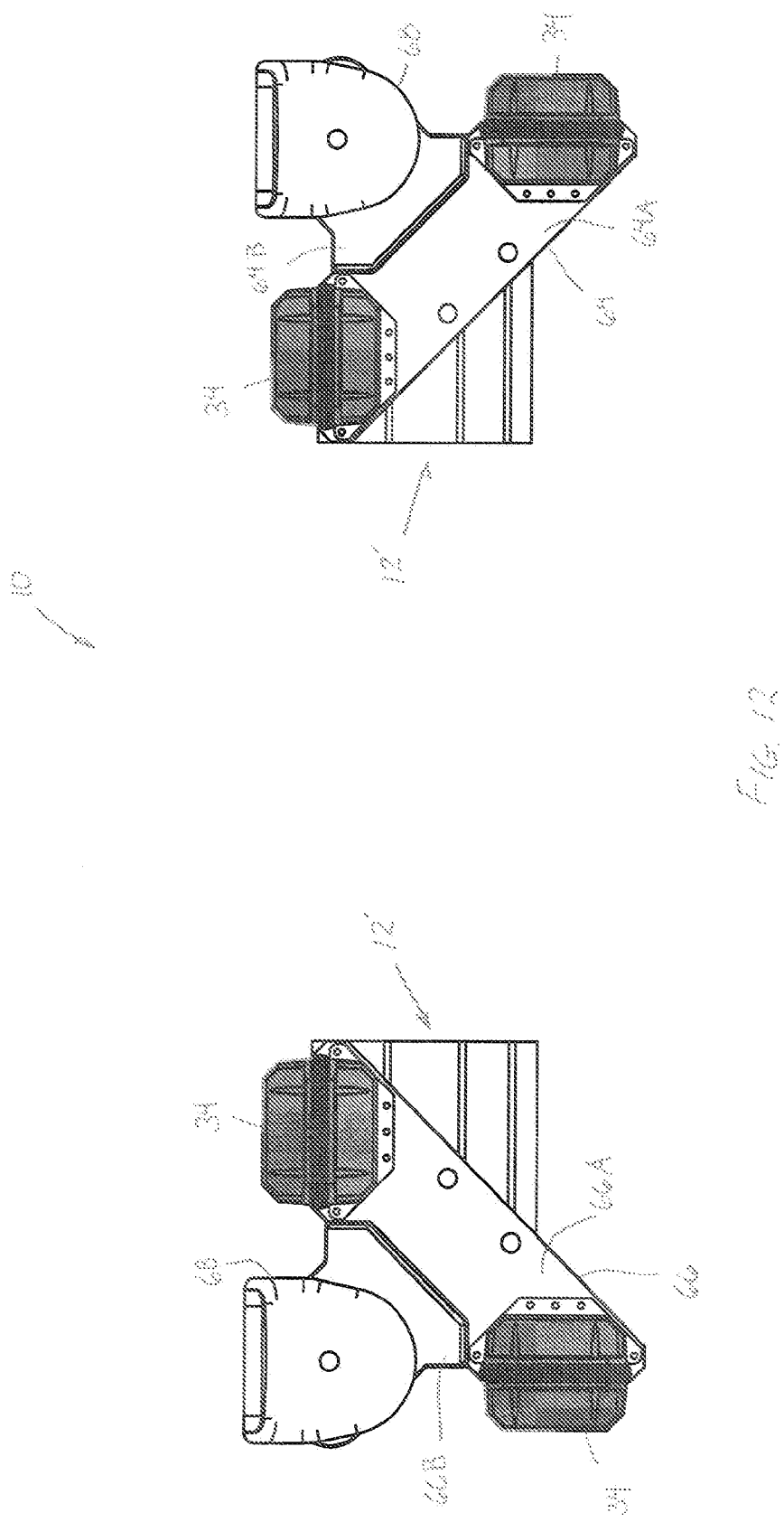

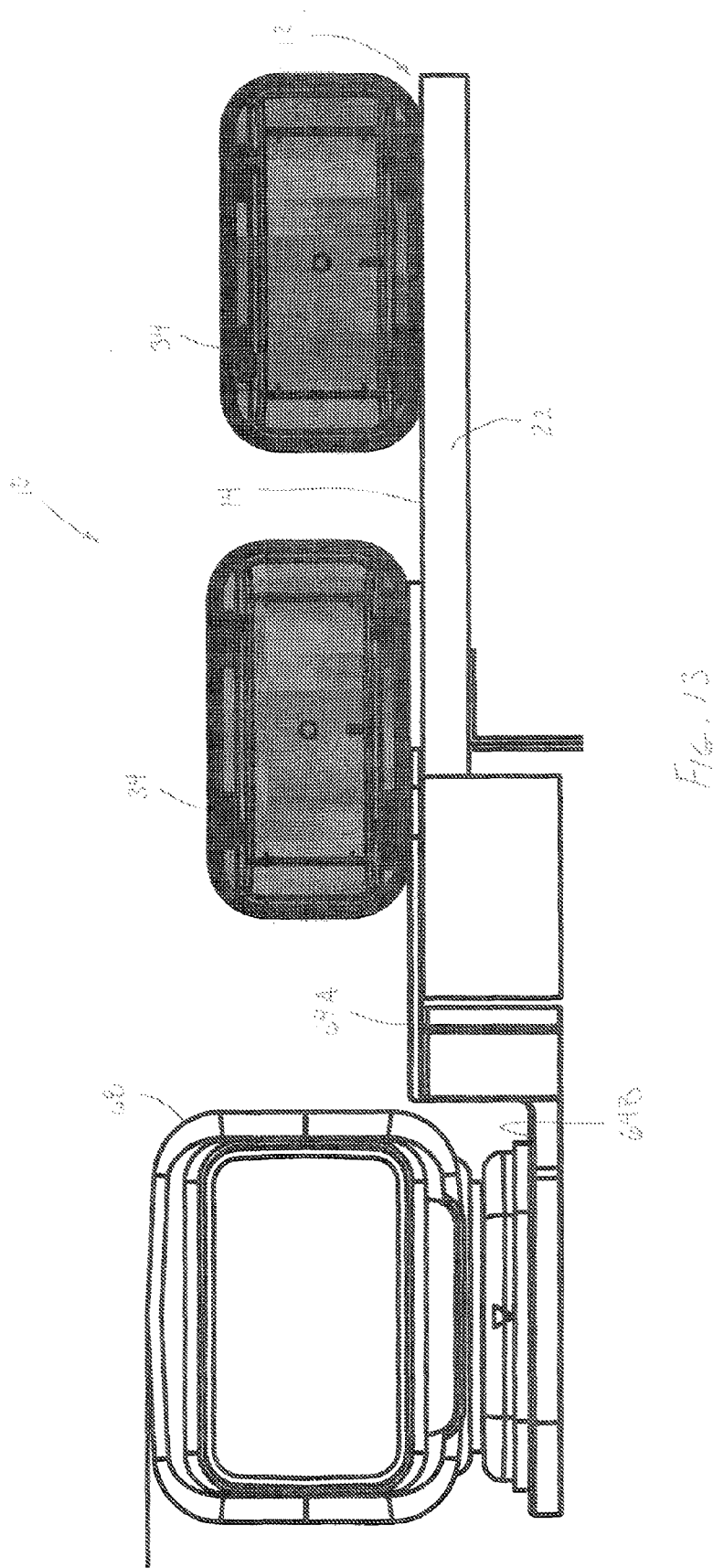

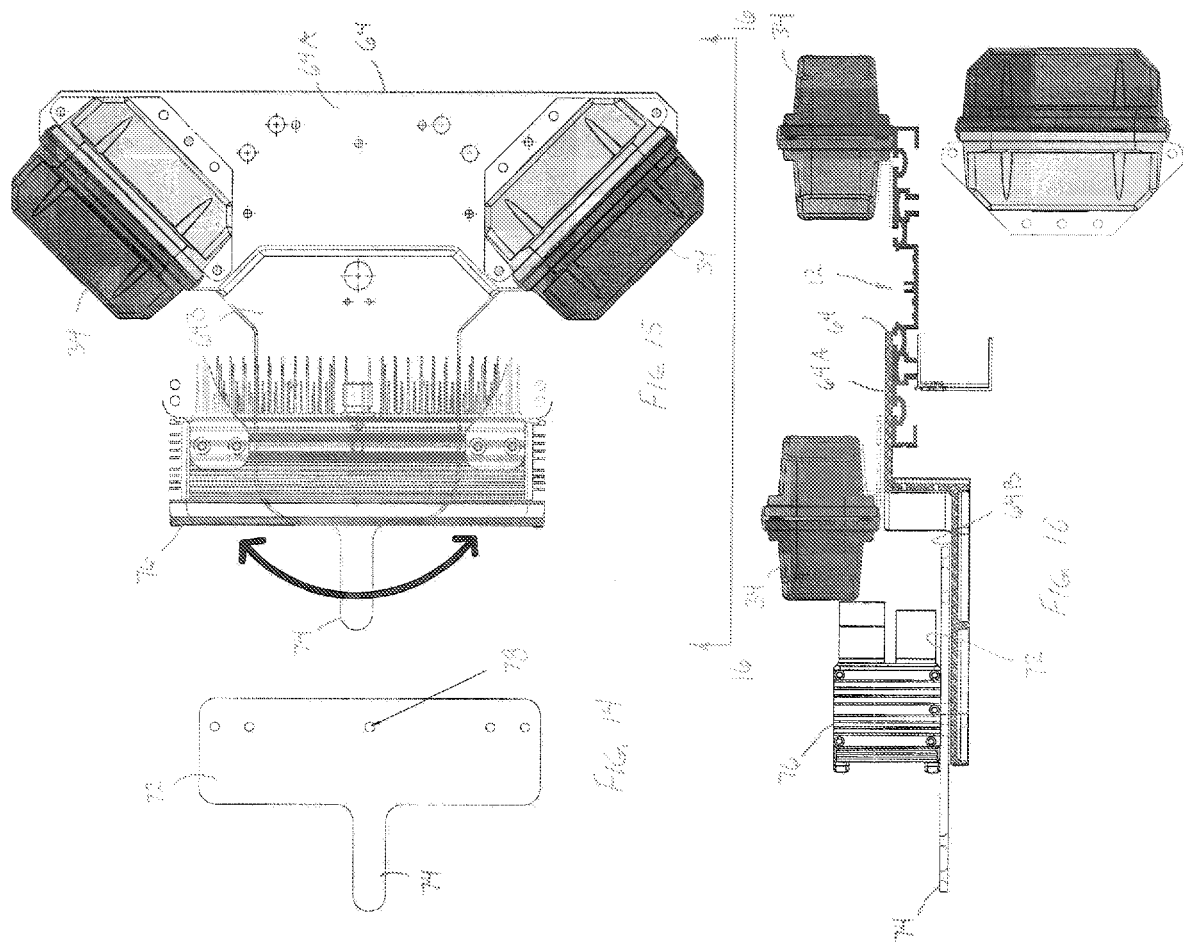

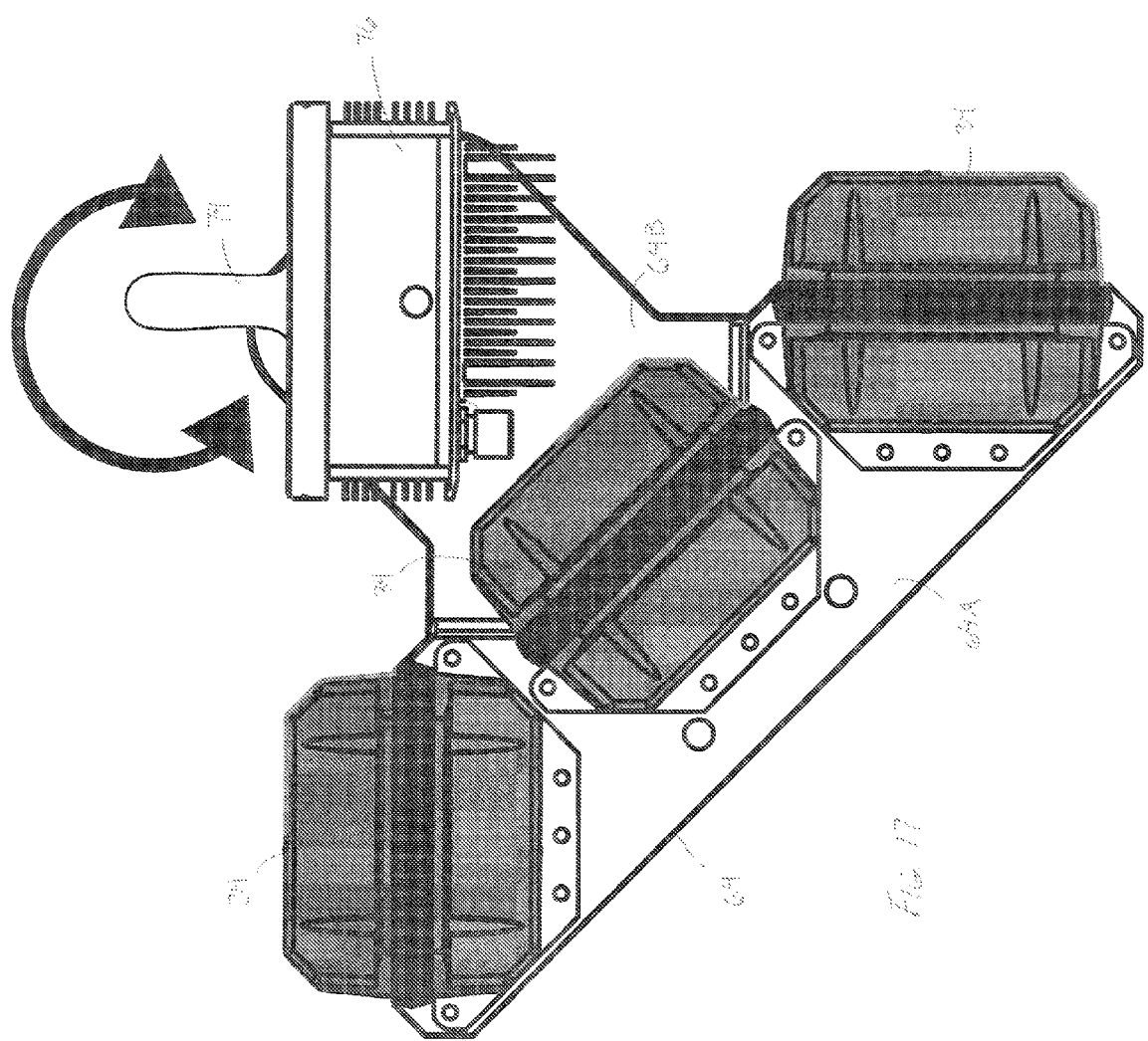

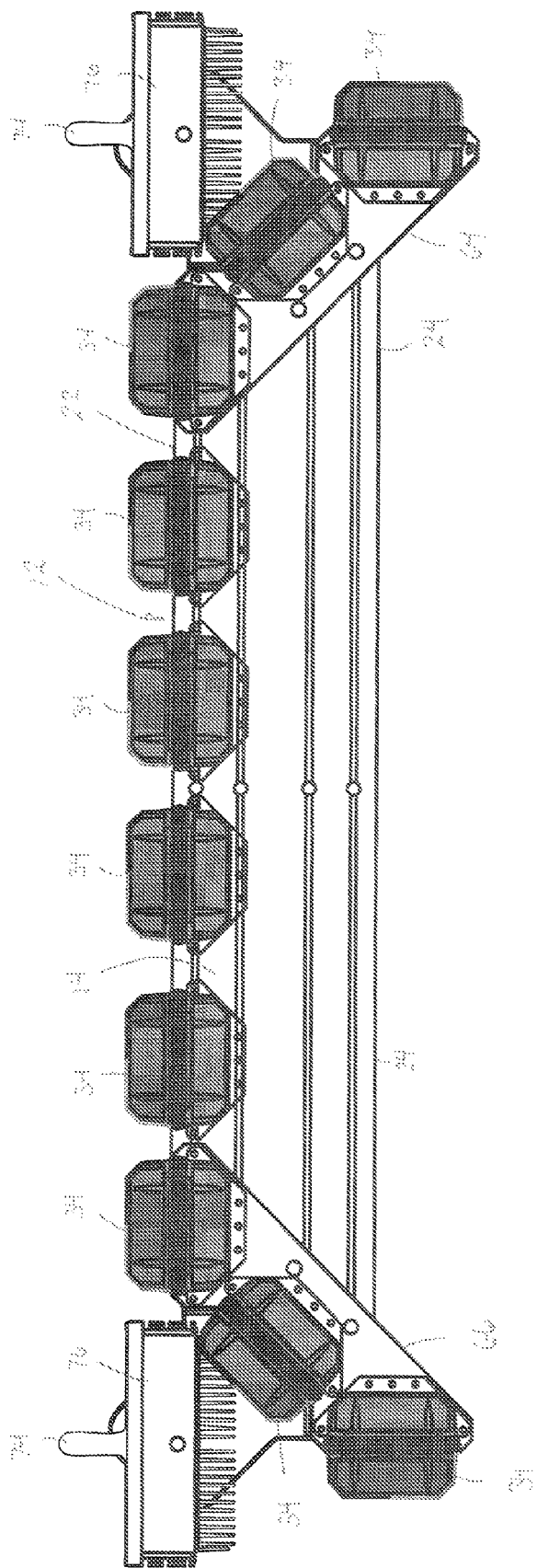

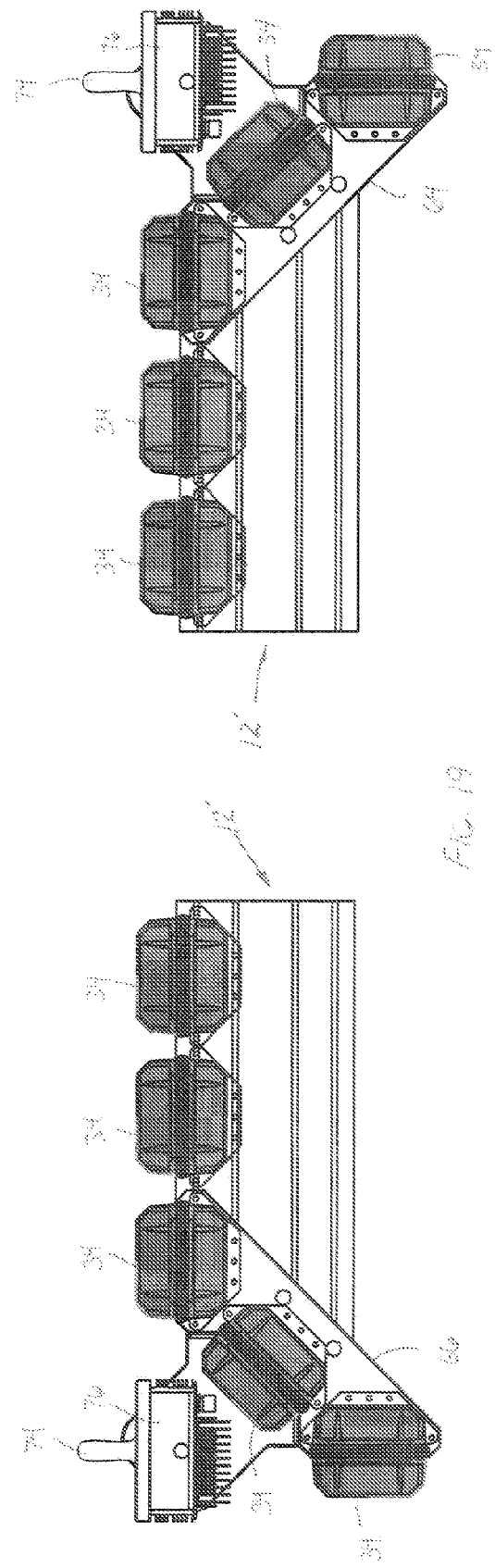

EMERGENCY VEHICLE LIGHT BAR

BACKGROUND OF THE INVENTION

1. Field of the Invention

The present invention pertains to a light bar for use on the exterior of emergency vehicles. The light bar is comprised of an elongate base that is mounted across the width of an emergency vehicle exterior. The base provides a versatile mounting platform for primary visual and audible warning devices as well as providing a mounting platform for other types of equipment such as secondary visual and audible devices, optical devices, cameras, weather monitoring equipment, GPS devices, preemption devices, running lights and other devices that have been traditionally mounted on an emergency vehicle roof and/or other exterior surface areas of the emergency vehicle. The light bar is versatile in both allowing many different devices to be selectively mounted and adjustably positioned on the base, and in also facilitating the electrical wiring and servicing of the different devices mounted on the base.

2. Description of the Related Art

The use of a light bar on the exterior of an emergency vehicle can be traced back to the early 1970's. The typical light bar construction includes an extruded frame or tubular member supporting one or more optical signaling devices. Light bars of this type have been used on emergency vehicles by mounting the frame or tubular member to the roof or top of the vehicle with the light bar extending substantially across the entire width of the vehicle. Over the years, light bars have been designed in different shapes and with different features, but the basic construction of a light bar having a tubular frame with one or more optical signaling devices mounted on the frame has not changed.

Within the area of fire and rescue emergency vehicles, new equipment required or desired on the exteriors of the vehicles has created a need for a new light bar. The roles and demands of modern fire fighting services require more equipment to be mounted on the exterior of emergency vehicles, and particularly on the roofs of the emergency vehicles.

Examples of some of the new equipment desired on emergency vehicles include brow or roof perimeter mounted scene lights; remote controlled spotlights; and high performance side lights. Lights and other devices of this type have been traditionally mounted directly to the roofs of the vehicles. For a time, roof mounting these devices sufficed. However, with the interiors of newer emergency vehicles having forward-deploying air bags and side-deploying air bags that are enclosed inside the roof structure in the area of the roof perimeter, mounting devices on the exterior of the roof perimeter by drilling holes for mounting fasteners presented the problem of the drilling and/or fasteners potentially interfering with air bag deployment systems as well as potentially detracting from the vehicle cab structural integrity. In addition, individually mounting each of the required and/or desired devices to the emergency vehicle exterior would require an increasing installation time for the increasing number of individual devices.

SUMMARY OF THE INVENTION

The light bar of the present invention was created to overcome the problems associated with mounting an increased number of warning signal lights as well as other such equipment to the exterior of an emergency vehicle.

The light bar is basically comprised of a base that is designed to be mounted on the exterior of an emergency vehicle. The base provides a mounting platform that allows for releasably attaching multiple light pods and other emergency equipment to the base and for adjustably positioning the light pods and equipment on the base. The light bar also comprises a number of pairs of end plates of different configurations that are attachable to one or both ends of the base. The pairs of end plates provide support for different numbers of light pods and other equipment in various different combinations and relative positions on the end plates.

The base of the light bar is designed to be inexpensively manufactured as an extruded member, for example of extruded aluminum. The base is formed with opposite, flat and parallel top and bottom surfaces that extend the entire longitudinal length of the base, and opposite, flat and parallel front and rear surfaces that extend the entire longitudinal length of the base. The base is also formed with opposite, flat left and right end surfaces at the longitudinally opposite ends of the base. The left and right end surfaces extend the entire lateral width of the base and are positioned at an angle to each other. In the preferred embodiment, the left and right end surfaces are oriented at a 45 degree angle.

The base is also formed with a plurality of straight, parallel mounting channels inside the base that extend through the entire length of the base. Each channel emerges from inside the base through the left and right end surfaces of the base.

The base is also formed with a plurality of straight, parallel mounting slots through the base top and bottom surfaces. Each mounting slot communicates with a channel inside the base and provides access to the channel from outside the base through the mounting slot.

The channels and their associated slots formed in the base top and bottom surfaces provide mounting tracks for signal light pods as well as other equipment. The channels and their associated slots extending the entire length of the base allows for adjustably positioning the signal light pods or other equipment mounted in the mounting tracks, as well as easily replacing the light pods or other equipment on the base. The number of light pods and equipment and their positions on the base can be adjusted by the end user of the light bar to fit the needs of the end user. In addition to the mounting tracks formed by the channels and their associated slots, the front and rear surfaces of the base can also be used for mounting signal lights creating 360 degrees of light around the base, or for mounting other equipment.

The base is also formed with at least one wire trough recessed into the top surface of the base and at least one wire trough formed in the bottom surface of the base. The wiring trough formed in the top surface of the base is designed for easy access to and accommodation of the wiring of the signal light pods and other equipment mounted on the base. The wiring trough formed in the bottom surface of the base provides accommodations for and access to the wiring of any signal light pods and/or other equipment mounted to the front and rear surfaces of the base.

The light bar also includes a cover that is releasably attachable to the base top surface. The cover is dimensioned and shaped to cover over the wiring trough in the base top surface as well as cover over the left and right trough openings in the base respective left and right end surfaces. In this manner, the cover completely encloses the wiring trough in the base top surface from outside the base.

As stated earlier, the light bar also comprises pluralities of pairs of left and right end plates that are releasably attachable to the respective left and right end surfaces of the base. In each pair of left and right end plates, the left and right end plates have mirror image configurations that are different from the configurations of the left and right end plates of the other pairs.

At least one pair of the plurality of pairs of left and right end plates includes left and right end plates that are each configured for supporting at least one, but more likely two light pods secured stationary to each end plate of the pair with the two light pods directed in perpendicular directions. More specifically, one of the light pods is directed in a direction perpendicular to the front and rear surfaces of the base and the other light pod is directed in a direction parallel to the front and rear surfaces of the base.

At least one other pair of the plurality of pairs of left and right end plates includes left and right end plates that are each configured for supporting two light pods secured stationary to the end plates with the two light pods directed in perpendicular directions, and with a third light pod secured stationary to the end plate where the third light pod is directed in a direction between the perpendicular directions of the two light pods.

At least one other pair of the pluralities of pairs of left and right end plates includes left and right end plates where each end plate is configured to support two light pods secured stationary to the end plate with the two light pods being directed in perpendicular directions, and to support a third light pod or search light between the two light pods where the third light is movably secured to the end plate and is directable in different directions. The movement of the third light could be remotely controlled, or could be manually controlled. In addition, each end plate could be configured to support lights and other equipment at different elevations on the end plate.

The light bar of the invention provides a mounting platform for the primary visual and audible warning devices of an emergency vehicle, as well as for other equipment such as optical devices, cameras, weather monitoring equipment, GPS devices, running lights and other similar equipment that traditionally has been mounted on an emergency vehicle roof. The light bar is versatile in both allowing many different signaling devices and other equipment to be mounted to an emergency vehicle, and by also allowing for the ease of replacing signal lights and other equipment, adjustably positioning signal lights and other equipment, and for servicing the signal lights and other equipment mounted on an emergency vehicle.

DESCRIPTION OF THE DRAWINGS

Further features of the light bar of the invention are set forth in the following detailed description of the light bar and in the drawing figures.

FIG. 1 is a top plan view of the light bar base.

FIG. 2 is a bottom plan view of the light bar base.

FIG. 3 is a right side elevation view of the light bar base, with the left side elevation view being a mirror image of the right side elevation view.

FIG. 4 is a top plan view of a right end plate of one pair of end plates of the pluralities of pairs of end plates comprised by the light bar.

FIG. 5 is a top plan view of the light bar base with right and left end plates of the configuration shown in FIG. 4 attached to the opposite ends of the base.

FIG. 6 is a view of the light bar assembly similar to that of FIG. 5, but with the light bar base being divided into a two-piece construction comprised of right and left side portions of the base.

FIG. 7 is a top plan view of a right end plate of a second pair of right and left end plates of the light bar.

FIG. 8 is a top plan view of the light bar base having a pair of right and left end plates having the configuration of the right end plate of FIG. 7 mounted thereon.

FIG. 9 is a top plan view of the light bar assembly similar to that of FIG. 8, but with the light bar shown as a two-piece construction comprised of right and left portions of the light bar base.

FIG. 10 is a top plan view of a right end plate of a third pair of right and left end plates of the light bar.

FIG. 11 is a top plan view of the light bar base having a pair of right and left end plates of the configuration shown in FIG. 10 mounted thereon.

FIG. 12 is a top plan view of the light bar that is similar to that shown in FIG. 11, but showing the light bar base in its two-piece construction comprised of right and left portions of the base.

FIG. 13 is a front elevation view of the right end plate of the pair of end plates shown in FIGS. 11 and 12.

FIG. 14 is a top plan view of a manually movable device support that can be mounted on the right and left end plates shown in FIGS. 10-13.

FIG. 15 is a top plan view of the device support of FIG. 14 mounted for manual movement on a right side end plate of the type shown in FIGS. 10-13.

FIG. 16 is a side elevation view of the device support and right side end plate of FIG. 15 from along the line 16-16 shown in FIG. 15.

FIG. 17 is a top plan view of the right side end plate of FIG. 15 with an additional light mounted on the end plate.

FIG. 18 is a top plan view of the light bar base having a pair of right and left end plates of the configuration shown in FIG. 15 mounted to the opposite ends of the base.

FIG. 19 is a top plan view of the light bar similar to that of FIG. 18, but with the light bar shown as a two-piece construction comprised of right and left portions of the base.

DETAILED DESCRIPTION OF THE PREFERRED EMBODIMENT

As stated earlier, the light bar 10 of the present invention is basically comprised of a base 12 that is designed to be mounted on the exterior of an emergency vehicle, and in particular across the forward area of the vehicle roof. The base 12 provides a mounting platform that allows for releasably attaching multiple light pods of presently known construction, as well as other known and commonly used emergency vehicle equipment to the base, and for adjustably positioning the light pods and other equipment on the base. In the preferred embodiment, the base is inexpensively manufactured as an extruded member, for example an aluminum extruded member.

The base top and bottom are shown in FIGS. 1 and 2, respectively. The right side of the base is shown in FIG. 3, with the left side of the base being a mirror image thereof. The base 12 is formed with a top, flat surface 14 and an opposite bottom, flat surface 16. The top 14 and bottom 16 surfaces are parallel to each other and extend the entire longitudinal length of the base.

The base is also formed with a flat, left end surface 18 and an opposite flat, right end surface 20. The left 18 and right 20 end surfaces extend the entire lateral width of the base. As can be seen in FIGS. 1 and 2, the left 18 and right 20 end surfaces are not parallel to each other, but define an angle between the surfaces. In the preferred embodiment of the invention, the angle is a 45-degree angle.

The base is also formed with a front, flat surface 22 and a rear, flat surface 24. The front 22 and rear 24 surfaces are parallel to each other. The front 22 and rear 24 surfaces extend the entire longitudinal length of the base 22, but due to the angled orientations of the left end surface 18 and right end surface 20, the front flat surface 22 has a smaller longitudinal length than the rear flat surface 24. The corners defined by the front flat surface 22 and the left end 18 and right end 20 surfaces are obtuse angle corners. The corners defined by the rear surface 24 and the opposite left end surface 18 and right end surface 22 are acute angle corners.

The base 12 is also formed with a plurality of straight, parallel mounting channels 26, 28 inside the base between the base top 14 and bottom 16 surfaces and between the base front 22 and rear 24 surfaces. As shown in FIG. 3, each of the channels 26, 28 has a width dimension and configuration that corresponds to the cross-section configuration of a roundhead bolt. Opposite ends of each of the channels 26, 28 emerge from inside the base 12 through the opposite left end 18 and right end 20 surfaces of the base.

A plurality of straight, parallel mounting slots 30 are formed in the base top surface 14 and a plurality of straight, parallel mounting slots 32 are formed in the base bottom surface 16. Each of the slots 30 formed in the base top surface 14 communicates with a channel 26 formed inside the base and provides access to the channel 26 through the slot 30. Each of the mounting slots 32 formed in the base bottom surface 16 also communicates with a channel 28 inside the base and provides access to the channel 28 through the mounting slot 32. Each of the mounting slots 30, 32 has a width dimension that is smaller than the width dimension of the channel 26, 28 communicating with the slot. Each mounting slot 30, 32 has a length dimension that extends along the entire length dimension of the channel 26, 28 communicating with the slot. The configurations of the slots 30, 32 and their associated channels 26, 28 allow for the insertion of roundhead T-bolts through the slots 30, 32 and into the associated channels 26, 28 when removably and adjustably attaching signal light pods and other equipment and devices to the base 12. Additionally, the fasteners on light pods and other equipment can be inserted into the openings of the channels 26, 28 and slots 30, 32 in the base end surfaces 18, 20 and slid along the base length to desired positions on the base when mounting the pods and equipment on the base 12.

In addition to the slots 30, 32 and their associated channels 26, 28, the flat front surface 22 and flat rear surface 24 of the base 12 may be employed in mounting signal light elements, for example DOT marker lights as well as other equipment to the base to create 360 degrees of light around the base.

The channels 26, 28 and their associated slots 30, 32 formed in the base top 14 and bottom 16 surfaces provide mounting tracks for signal light pods as well as other equipment typically employed on emergency vehicles. The light pods 34 shown mounted to the base top surface 14 in FIGS. 5, 6, 8, 9, 11, 12, 17, 18 and 19 are representative of the different devices that can be mounted to the base 12. Although the light pods 34 are shown in the drawing figures, these representations should not be restricted to only light pods 34 and it should be understood that other equipment and devices can be mounted to the base 12 in the same manner as the light pods 34.

The channels 26, 28 and their associated slots 30, 32 extending the entire length of the base 12 allow for adjustably positioning the light pods or other equipment mounted in the mounting tracks formed by the channels and slots, as well as easily replacing the light pods or other equipment on the base 12. The number of light pods and equipment and their positions on the base 12 can be adjusted by the end user of the light bar to fit the needs of the end user. In addition to the mounting tracks formed by the channels 26, 28 and their associated slots 30, 32, the front 22 and rear 24 surfaces of the base 12 can also be used for mounting signal light pods or other equipment in any desired positions on these surfaces creating 360 degrees of light around the base. The construction of the base also allows the end user to control the positioning of light on the base to achieve the desired pattern of light around the vehicle on which the light bar is used.

Although the base 12 is shown as a single extruded member in FIGS. 1, 2, 5, 8, 11, and 17, the base 12 could also be provided in a two-piece construction represented in FIGS. 6, 9, 12, and 18. The base in the two-piece construction could be provided by cutting a one-piece extrusion of the base 12, or providing the base as a two-piece extrusion.

The base 12 is also formed with an upper wiring trough 38 in the top surface 14 of the base, and with two lower wiring troughs 40, 42 in the bottom surface 16 of the base. The upper wiring trough 38 is formed in the center of the width of the base 12 where it can easily accommodate wiring of light pods and other equipment mounted in the channels 26 and slots 30 both in front of and behind the wiring trough 38. The wiring trough 38 has a longitudinal length that extends the entire longitudinal length of the base 12. This provides for easy access to and accommodation of the wiring of the signal light pods and other equipment mounted on the base top surface 14.

The lower wiring troughs 40, 42 are formed in the base bottom surface 16 just behind the respective base front surface 22 and base rear surface 24. Here, the lower wiring troughs 40, 42 are easily accessible to the wiring of any light pods or other equipment mounted to the respective front surface 14 and rear surface 16 of the base 12.

The light bar 10 also comprises a cover 46 that is releasably attachable to the top surface 14 of the base 12. The cover 46 has a length dimension and configuration that extends across the entire top opening of the upper wiring trough 34. The cover 46 is also provided with end walls that cover over and close the openings of the upper wiring trough 38 through the respective left end surface 18 and right end surface 20 of the base 12. In this manner, the cover 46 and its end walls completely enclose the upper wiring trough 38 from outside the base 12.

The light bar 10 also comprises pluralities of pairs of left and right end plates where the left end plate of each pair is releasably attachable to the base 12 over the left end surface 18 of the base and the right end plate of each pair is releasably attachable to the base 12 over the right end surface 20 of the base. In the embodiment of the light bar to be described, there are three pairs of left and right end plates. In each pair of left and right end plates, the left and right end plates have mirror image configurations. In addition, the configurations of the left and right end plates of each pair of end plates is different from the configurations of the left and right end plates of the other pairs of end plates. The light bar could also be provided with more than three pairs of end plates or fewer than three pairs of end plates.

FIG. 4 shows the right end plate 52 of a first pair of left and right end plates. The left end plate 54 of the first pair of end plates is a mirror image of the right end plate 52. The right 52 and left 54 end plates can be seen mounted on a one-piece base 12 in FIG. 5 and on a two-piece base 12' in FIG. 6. Each of the right 52 and left 54 end plates is flat and provides a flat planar surface for supporting at least two light pods 34 as shown in the drawing figures. In a variation of the use of the right 52 and left 54 end plates, each end plate could be employed in supporting only a single light pod. Both the right 52 and left 54 end plates are specifically configured and provided with fastener holes positioned for lining up with the base mounting channels and slots and for supporting two light pods 34 secured stationary to the end plates with the two light pods 34 being directed in perpendicular directions. As seen in FIGS. 5 and 6, one of the light pods 34 is directed in a direction parallel to the longitudinal length of the base 12, 12' and the other light pod 34 is directed in a direction perpendicular to the longitudinal length of the base 12, 12'. Stated differently, one of the light pods 34 is directed in a direction perpendicular to the front 22 and rear 24 surfaces of the base 12, 12' and the other light pod 34 is directed in a direction parallel to the front 22 and rear 24 surfaces of the base.

In addition to the light pods 34 supported on the right 52 and left 54 end plates, FIGS. 5 and 6 show the base 12, 12' supporting additional light pods 34, or other equipment attached to the base 12, 12' and directed in a direction perpendicular to the base front surface 22. As stated earlier, the light bar 12 of the invention is designed to facilitate the adjustable attachment and removal of not only light pods 34, but other types of equipment employed on firefighting and emergency vehicles. Therefore, it is intended that the light pods 34 shown in the drawing figures represent conventional light pods as well as these other known types of equipment.

FIG. 7 shows the right end plate 58 of the second pair of left and right end plates. The left end plate 60 is a mirror image of the right end plate 58 and can be seen attached to a one-piece light bar 12 in FIG. 8 and a two-piece light bar 12' in FIG. 9. As seen in FIG. 7, the right and left end plates 50, 60 of the second pair are specifically configured and provided with fastener holes positioned for lining up with the base mounting channels and slots and for supporting three light pods 34 secured stationary to the end plates 58, 60. The right 58 and left 60 end plates of the second pair provide flat support surfaces for three light pods 34. As seen in FIGS. 7-9, the right 58 and left 60 end plates of the second pair support the three light pods 34 with two of the light pods secured stationary to the end plates directed in perpendicular directions, and with a third light pod secured stationary to the end plates where the third light pod is directed in a direction between the perpendicular directions of the two light pods.

Again, FIG. 8 illustrates the possibility of attaching additional light pods 34 or other equipment to the base 12 in addition to the pair of right 58 and left 60 end plates supporting the light pods 34.

FIG. 10 shows the right end plate 64 of the third pair of right 64 and left 66 end plates. As in the other pairs of end plates, the right end plate 64 and left end plate 66 of the third pair have configurations that are mirror images of each other. The right 64 and left 66 end plates are shown attached to the opposite ends of a one-piece light bar 12 in FIG. 11 and are shown attached to a two-piece light bar 12' in FIG. 12. The end plates 62, 64 of the third pair differ from those of the previously described pairs in that the end plates provide first flat surface areas 64A, 66A and second flat surface areas 64B, 66B that are parallel surfaces at different elevations. FIG. 13 shows a front view of the right end plate 64 that illustrates the difference in elevation of the first surface area 64A of the end plate and the second surface area 64B of the end plate. The first surface areas 64A, 66A of the end plates are configured as flat support surfaces with fastener holes positioned for lining up with the base mounting channels and slots and to support a pair of light pods 34 secured stationary to the support surface with the two light pods being directed in perpendicular directions. The second support surfaces 64B, 66B of the end plates provide flat support surfaces with fastener holes for a third light pod or other equipment, such as the remote search light 68 shown in FIGS. 10-12.

FIGS. 14-19 show the right 64 and left 66 end plates of the third pair in which the search light 68 has been replaced by a manually movable support panel 72 having a projecting handle 74. The support panel 72 is configured as a flat panel providing a flat support surface with fastener holes for a device such as the LED brow light 76 shown mounted on the panel 72 in FIGS. 15-19, or some other device. The support panel 72 has a pivot hole 78 that enables the panel 72 to be mounted on the lower, second support surface 64B, 66B of the end plates 64, 66 of the third pair for pivoting movement of the support panel 72 relative to the end plates. The manual handle 74 of the support panel 72 can be gripped by a user to move the panel 72 and thereby direct the light mounted to the support panel.

FIG. 15 shows the right end plate 64 of the third pair with a pair of light pods 34 secured stationary to the upper support surface 64A, and the manual support panel 72 and brow light 76 secured for pivoting movement to the lower support surface 64B. FIG. 17 shows the same end plate 64 but with an additional light pod 34 secured stationary to the upper support surface 64A. The right end plate 64 of FIG. 17 is shown mounted to the right end of a one-piece light bar base 12 in FIG. 18 with the matching left end plate assembly shown attached to the left end of the base 12, and FIG. 19 illustrates the two end plates 64, 66 of FIG. 18 attached to the opposite ends of a two-piece light bar base 12'.

The light bar of the invention described above with its one-piece base 12 or two-piece base 12', and the three or more pairs of end plates together with the combinations of light pods, search lights or other equipment mounted on the end plates provide a versatile light bar that allows many different signaling devices and other equipment to be mounted to a firefighting or emergency vehicle. The light bar of the invention also allows for the ease of replacing signal lights and other equipment, adjustably positioning the signal lights and other equipment, and for servicing the signal lights and other equipment mounted on a firefighting or emergency vehicle.

As various modifications could be made in the constructions herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A light bar comprising:

a base having a longitudinal length and a lateral width, the base having opposite top and bottom surfaces that extend the entire length of the base, the base bottom surface being mountable to an exterior surface of a vehicle, the base having opposite front and rear surfaces that extend the entire length of the base, and the base having opposite left and right end surfaces at longitudinally opposite ends of the base;

a mounting channel inside the base between the top and bottom surfaces and the front and rear surfaces, the channel having a width dimension that is smaller than the base width and the channel having a length dimension that extends along the length of the base;

a mounting slot through the base top surface communicating with the channel and providing access to the channel from outside the base through the slot, the slot having a width dimension that is smaller than the width dimension of the channel communicating with the slot and the slot having a length dimension that extends along the entire length of the channel communicating with the slot;

a plurality of separate light pods, each of the light pods being releasably mounted for easy replacement directly to the base top surface by a fastener associated with the light pod extending from the light pod through the mounting slot and into the mounting channel communicating with the mounting slot, each of the light pods being individually slideable and adjustably positionable along the mounting slot length and along the mounting channel length to a desired adjusted position of the light pod on the base top surface to adjust a pattern of light from the plurality of light pods around the base;

at least three pairs of left and right end plates, each end plate having fastener holes positioned on the end plate where the fastener holes line up with the base mounting slot and mounting channel for releasably attaching each end plate directly to the base; the three pairs of left and right end plates being interchangeably attachable to the base with the left and right end plates of each pair positioned at the respective left and right end surfaces of the base, the left and right end plates of each pair having mirror image configurations, and the at least three pairs of left and right end plates having different configurations where a first pair of left and right end plates are each configured to support at least one light pod secured stationary thereto, where a second pair of left and right end plates are each configured to support two light pods secured stationary thereto where the two light pods are directed in perpendicular directions and to support a third light pod secured stationary thereto where the third light pod is directed in a direction between the perpendicular directions of the two light pods, and where a third pair of left and right end plates are each configured to support two light pods secured stationary thereto where the two light pods are directed in perpendicular directions and to support a third light pod movably secured thereto where the third light pod is directable in different directions; and, the base, the mounting slot through the base top surface, the light pods releasably mounted on the base top surface and adjustably positionable along the mounting slot and each pair of left and right end plates attachable to the base are all exposed to an exterior environment of the light bar in use of the light bar for easy access and replacement and position adjustment of the light pods on the base and easy access and replacement and position adjustment of the pair of left and right end plates on the base.

2. The light bar of claim 1, further comprising:
the third light pod of the third pair of left and right end plates being remotely controllable to move in different directions.

3. The light bar of claim 1, further comprising:
the third light pod of the third pair of left and right end plates being manually movable in different directions.

4. The light bar of claim 1, further comprising:
the two light pods and the third light pod of the second pair of left and right end plates are positioned at different elevations.

5. The light bar of claim 1, further comprising:
the two light pods and the third light pod of the third pair of left and right end plates are positioned at different elevations.

6. A light bar comprising:

a base having a longitudinal length and a lateral width, the base having opposite, flat and parallel top and bottom surfaces that extend the entire length of the base, the base having opposite, flat and parallel front and rear surfaces that extend the entire length of the base, and the base having opposite, flat left and right end surfaces at longitudinally opposite ends of the base that extend the entire width of the base;

a plurality of straight, parallel mounting channels inside the base between the top and bottom surfaces and the front and rear surfaces, each channel having a width dimension that is smaller than the base width and each channel having a length dimension that extends through the entire length of the base with each channel emerging from inside the base through opposite left and right channel openings in the respective left and right base end surfaces;

a plurality of straight, parallel mounting slots through the base top surface, each slot communicating with a channel and providing access to the channel from outside the base through the slot, each slot having a width dimension that is smaller than the width dimension of the channel communicating with the slot and each slot having a length dimension that extends along the entire length of the channel communicating with the slot;

a plurality of separate light pods, each of the light pods being releasably mounted for easy replacement directly to the base top surface by a fastener associated with the light pod extending from the light pod through one of the mounting slots and into the mounting channel communicating with the mounting slot, each of the light pods being individually slideable and adjustably positionable along the mounting slot length and along the mounting channel length to a desired adjusted position of the light pod on the base top surface to adjust a pattern of light from the plurality of light pods around the base;

left and right end plates having mirror image configurations, each end plate having fastener holes positioned on the end plate where the fastener holes line up with a base mounting slot and mounting channel for releasably attaching each end plate directly to the base, the left and right end plates being attachable to the base top surface with the left and right end plates projecting outwardly from the respective left and right base end surfaces, the left and right end plates each being configured for supporting at least two light pods secured stationary thereto with the two light pods directed in perpendicular directions; and, the base, the mounting slots through the base top surface, the light pods releasably mounted to the base top surface and adjustably positionable along the mounting slot and the left and right end plates attachable to the base are all exposed to an exterior environment of the light bar in use of the light bar for easy access and replacement and position adjustment of the light pods on the base and easy access and replacement and position adjustment of the left and right end plates on the base.

7. The light bar of claim 6, further comprising:
one of the two light pods on each end plate being directed in a direction that is perpendicular to the bar front surface and one of the two light pods on each end plate being directed in a direction that is parallel to the bar front surface.

8. The light bar of claim 6, further comprising:
the left and right end plates being one pair of a plurality of pairs of left and right end plates where each pair of left and right end plates is attachable to the base top surface in place of other pairs of left and right end plates in the plurality of pairs of left and right end plates.

9. The light bar of claim 8, further comprising:
the left and right end plates of each pair having fastener holes that are positioned to align with at least two of the base mounting slots and their associated mounting channels.

10. The light bar of claim 6, further comprising:
the left and right end plates being one pair of a plurality of pairs of left and right end plates where each pair of left and right end plates is configured for supporting light pods secured stationary in arrangements that are different from arrangements of light pods secured stationary to other pairs of left and right end plates of the plurality of pairs of left and right end plates.

11. A light bar comprising:
a base having a longitudinal length and a lateral width, the base having opposite, flat and parallel top and bottom surfaces that extend the entire length of the base, the base having opposite, flat and parallel front and rear surfaces that extend the entire length of the base, and the base having opposite, flat left and right end surfaces at longitudinally opposite ends of the base that extend the entire width of the base and are oriented at obtuse angles relative to the front surface of the base and are oriented at acute angles relative to the rear surface of the base;
a plurality of straight, parallel mounting channels inside the base between the top and bottom surfaces and the front and rear surfaces, each channel having a width dimension that is smaller than the base width and each channel having a length dimension that extends through the entire length of the base with each channel emerging from inside the base through opposite left and right channel openings in the respective left and right base end surfaces;
a plurality of straight, parallel mounting slots through the base top and bottom surfaces, each slot communicating with a channel and providing access to the channel from outside the base through the slot, each slot having a width dimension that is smaller than the width dimension of the channel communicating with the slot and each slot having a length dimension that extends along the entire length of the channel communicating with the slot;
a plurality of separate light pods, each of the light pods being releasably mounted for easy replacement directly to the base top surface by a fastener associated with the light pod extending from the light pod through one of the mounting slots and into the mounting channel communicating with the mounting slot, each of the light pods being individually slideable and adjustably positionable along the mounting slot length and along the mounting channel length to a desired adjusted position of the light pod on the base top surface to adjust a pattern of light from the plurality of light pods around the base;
left and right end plates having mirror image configurations, each end plate having fastener holes positioned on the end plate where the fastener holes line up with a base mounting slot and mounting channel for releasably attaching each end plate directly to the base, the left and right end plates being attachable to the base top surface with the left and right end plates projecting outwardly from the respective left and right base end surfaces, the left and right end plates each having a flat support surface configured for supporting at least two light pods secured stationary to the support surface with the two light pods directed in perpendicular directions; and,
the base, the mounting slots through the base top surface, the light pods releasably mounted to the base top surface and adjustably positionable along the mounting slot and the left and right end plates attachable to the base are all exposed to an exterior environment of the light bar in use of the light bar for easy access and replacement and position adjustment of the light pods on the base and easy access and replacement and position adjustment of the left and right end plates on the base.

12. The light bar of claim 11, further comprising:
the left and right end plates being one pair of a plurality of pairs of left and right end plates where each pair of left and right end plates is attachable to the base top surface in place of other pairs of left and right end plates of the plurality of pairs of left and right end plates.

13. The light bar of claim 12, further comprising:
the left and right end plates of each pair having fastener holes that are positioned to align with at least two of the base mounting slots and their associated mounting channels.

14. The light bar of claim 11, further comprising:
the left and right end plates being one pair of a plurality of pairs of left and right end plates where each pair of left and right end plates has support surfaces configured for supporting light pods secured stationary to the support surfaces in arrangements that are different from arrangements of light pods secured stationary to the support surfaces of other pairs of left and right end plates of the plurality of pairs of left and right end plates.

15. The light bar of claim 11, further comprising:
the support surface of each of the left and right end plates being configured for supporting the at least two light pods and a third light pod that is mounted for movement on the support surface.

16. The light bar of claim 11, further comprising:
the support surface of each of the left and right end plates having spaced upper and lower parallel surface portions with each surface portion configured for supporting at least one light pod.

17. The light bar of claim 11, further comprising:
at least two slots in the base top surface where each slot communicates with a channel inside the base.

18. The light bar of claim 11, further comprising:
at least two slots in the base bottom surface where each slot communicates with a channel inside the base.

* * * * *